United States Patent
Zafiroglu

(10) Patent No.: US 7,431,975 B2
(45) Date of Patent: Oct. 7, 2008

(54) TEXTURED COMPOSITE MATERIAL

(75) Inventor: Dimitri P Zafiroglu, Centreville, DE (US)

(73) Assignee: DZS, L.L.C., Midlothian, VA (US)

( * ) Notice: Subject to any disclaimer, the term of this patent is extended or adjusted under 35 U.S.C. 154(b) by 14 days.

(21) Appl. No.: 10/307,186

(22) Filed: Nov. 29, 2002

(65) Prior Publication Data

US 2004/0106345 A1   Jun. 3, 2004

(51) Int. Cl.
| | |
|---|---|
| *B32B 33/00* | (2006.01) |
| *B32B 5/02* | (2006.01) |
| *B32B 3/10* | (2006.01) |
| *B32B 27/04* | (2006.01) |
| *B32B 27/12* | (2006.01) |
| *B29C 65/00* | (2006.01) |
| *B29C 65/02* | (2006.01) |

(52) U.S. Cl. ............... 428/98; 428/131; 442/59; 442/61; 442/86; 442/148; 442/181; 442/304; 156/60; 156/72; 156/297; 156/304.1; 156/304.4; 156/304.6; 156/304.7

(58) Field of Classification Search ............... 442/149, 442/89, 59, 61, 86, 148, 181, 304; 428/90–97, 428/340, 113, 88, 89, 195.1, 196, 198, 170–172, 428/98, 131; 156/60, 72, 297, 304.1, 304.4, 156/304.6, 304.7
See application file for complete search history.

(56) References Cited

U.S. PATENT DOCUMENTS

| | | | |
|---|---|---|---|
| 1,817,184 | A | 8/1931 | Fuchs et al. |
| 2,317,595 | A | 4/1943 | Faris |
| 2,550,686 | A | 5/1951 | Goldman |
| 2,688,578 | A | 9/1954 | Teague |
| 2,787,571 | A | 4/1957 | Miller |
| 2,810,950 | A | 10/1957 | Rice |
| 2,917,421 | A | 12/1959 | Miller |

(Continued)

FOREIGN PATENT DOCUMENTS

GB   1080046   8/1967

(Continued)

OTHER PUBLICATIONS

Finishing of Nonwoven Bonded Fabrics, Rong, H., and Kotra, R, University of Tennessee Knoxville Nonwoven Science and Technology II, Fall, 1999 internet pub. http://trcs.he.utk.edu/textile/nonwovens/finish.html.

(Continued)

*Primary Examiner*—Norca Torres
*Assistant Examiner*—Matthew D Matzek
(74) *Attorney, Agent, or Firm*—Jeffrey C. Lew

(57) ABSTRACT

A laminated multilayer textured composite has an embossed fibrous outer layer bonded to one side of an adhesive layer to form a three-dimensional structure defined by all of fibers in depressed areas between elevated areas being fully embedded in the adhesive and most of the fibers in the elevated areas of the elevated areas being free of adhesive. The composite provides an abrasion resistant, surface stable material for covering floors, walls, furniture and the like. An optional backing layer can be simultaneously adhered to the second side of the adhesive layer primarily for improved cushioning and dimensional stability. The composite can be formed by a simultaneous pressure embossing and thermal laminating process.

22 Claims, 7 Drawing Sheets

U.S. PATENT DOCUMENTS

| | | | |
|---|---|---|---|
| 2,988,800 A * | 6/1961 | White | 428/89 |
| 3,015,149 A | 1/1962 | Foster et al. | |
| 3,081,515 A | 3/1963 | Griswold et al. | 428/131 |
| 3,166,465 A | 1/1965 | Rahmes | |
| 3,444,035 A | 5/1969 | Bushnell | |
| 3,476,636 A | 11/1969 | Crosby | |
| 3,506,530 A | 4/1970 | Crosby | |
| 3,616,135 A * | 10/1971 | Tesainer et al. | 428/88 |
| 3,620,890 A | 11/1971 | Kemmler | |
| 3,669,818 A | 6/1972 | Stark | |
| 3,687,796 A | 8/1972 | Stumpf et al. | |
| 3,695,987 A | 10/1972 | Wisotzky et al. | |
| 3,708,384 A | 1/1973 | Carpenter | |
| 3,720,554 A * | 3/1973 | Stumpf | 156/62.6 |
| 3,720,564 A | 3/1973 | Staats et al. | |
| 3,755,051 A * | 8/1973 | Stumpf | 428/89 |
| 3,816,228 A * | 6/1974 | Stumpf | 428/88 |
| 3,823,056 A * | 7/1974 | Cooney | 428/85 |
| 3,834,978 A | 9/1974 | Nisenson et al. | |
| 3,856,598 A | 12/1974 | Gregorian et al. | 156/85 |
| 3,860,469 A * | 1/1975 | Gregorian et al. | 156/83 |
| 3,867,243 A | 2/1975 | Stoller | |
| 3,922,454 A | 11/1975 | Roecker | |
| 3,940,529 A | 2/1976 | Hepford et al. | |
| 3,943,018 A | 3/1976 | Petry et al. | 156/79 |
| 3,947,306 A | 3/1976 | Haemer | |
| 3,950,582 A | 4/1976 | Keuchel | |
| 4,013,407 A | 3/1977 | Ray, Jr. | |
| 4,018,957 A | 4/1977 | Werner et al. | |
| 4,034,215 A | 7/1977 | Hashimoto | 156/245 |
| 4,042,453 A * | 8/1977 | Conway et al. | 162/108 |
| 4,098,629 A | 7/1978 | Goldstone | 156/87 |
| 4,138,521 A | 2/1979 | Brown | |
| 4,159,360 A | 6/1979 | Kim | |
| 4,172,170 A | 10/1979 | Foye | |
| 4,197,343 A | 4/1980 | Forsythe | |
| 4,217,383 A | 8/1980 | Patterson et al. | |
| 4,278,482 A | 7/1981 | Poteet et al. | 156/78 |
| 4,324,824 A | 4/1982 | Narens et al. | |
| 4,371,576 A | 2/1983 | Machell | |
| 4,389,442 A | 6/1983 | Pickens, Jr. et al. | |
| 4,389,443 A | 6/1983 | Thomas et al. | |
| 4,390,582 A | 6/1983 | Pickens, Jr. et al. | |
| 4,426,415 A | 1/1984 | Avery | |
| 4,442,161 A | 4/1984 | Kirayoglu et al. | 428/219 |
| 4,448,831 A * | 5/1984 | Civardi | 428/91 |
| 4,495,133 A | 1/1985 | Sugihara et al. | |
| 4,582,554 A | 4/1986 | Bell et al. | |
| 4,588,629 A | 5/1986 | Taylor | 428/88 |
| 4,637,942 A * | 1/1987 | Tomarin | 428/17 |
| 4,640,859 A | 2/1987 | Hansen et al. | |
| 4,643,930 A | 2/1987 | Ucci | |
| 4,731,274 A | 3/1988 | Ishida et al. | |
| 4,808,458 A * | 2/1989 | Watt et al. | 428/90 |
| 4,871,603 A | 10/1989 | Malone | |
| 4,892,777 A | 1/1990 | Wald et al. | |
| 4,919,743 A | 4/1990 | Johnston et al. | |
| 4,927,682 A * | 5/1990 | Nagura et al. | 428/88 |
| 4,942,074 A | 7/1990 | Bell et al. | |
| 4,988,551 A | 1/1991 | Zegler | 428/40 |
| 5,198,277 A | 3/1993 | Hamilton et al. | |
| 5,310,590 A | 5/1994 | Tochacek et al. | 428/102 |
| 5,370,757 A | 12/1994 | Corbin et al. | |
| 5,399,409 A | 3/1995 | Whiteman | |
| 5,415,925 A | 5/1995 | Austin et al. | |
| 5,436,064 A | 7/1995 | Schnegg et al. | |
| 5,443,881 A | 8/1995 | Higgins et al. | |
| 5,464,677 A | 11/1995 | Corbin et al. | |
| 5,472,763 A * | 12/1995 | Schwarz et al. | 428/95 |
| 5,560,972 A | 10/1996 | Blakely et al. | |
| 5,567,257 A | 10/1996 | Higgins et al. | 156/72 |
| 5,578,357 A | 11/1996 | Fink | |
| 5,652,041 A * | 7/1997 | Buerger et al. | 428/198 |
| 5,728,444 A | 3/1998 | Fink | |
| 5,747,133 A | 5/1998 | Vinod et al. | |
| 5,882,770 A | 3/1999 | Makansi | 428/156 |
| 5,902,663 A | 5/1999 | Justesen et al. | |
| 5,939,166 A | 8/1999 | Cheng et al. | |
| 5,962,101 A | 10/1999 | Irwin et al. | |
| 5,965,232 A | 10/1999 | Vinod | 428/85 |
| 5,990,377 A | 11/1999 | Chen et al. | |
| 6,063,473 A | 5/2000 | Zafiroglu | 428/86 |
| 6,162,748 A | 12/2000 | Schilling et al. | |
| 6,319,593 B1 * | 11/2001 | Kenmochi et al. | 428/198 |
| 6,506,472 B1 * | 1/2003 | Tanaka et al. | 428/105 |
| 6,774,070 B1 * | 8/2004 | Kenmochi et al. | 442/352 |
| 6,803,334 B2 | 10/2004 | Mizutani et al. | 442/394 |
| 2002/0119281 A1 | 8/2002 | Higgens et al. | |
| 2002/0132085 A1 | 9/2002 | Higgens et al. | |
| 2003/0232170 A1 | 12/2003 | Gillette et al. | 428/92 |
| 2006/0141881 A1 | 6/2006 | Bergsten et al. | |

FOREIGN PATENT DOCUMENTS

| | | |
|---|---|---|
| GB | 1128801 | 10/1968 |
| GB | 1194027 | 6/1970 |
| GB | 2185213 | 7/1987 |
| WO | WO 99/19557 | 4/1999 |

OTHER PUBLICATIONS

Flocking with cut flock from Swicofil, internet publication initial date unknown, printed Aug. 28, 2006, http://www.swicofil.com/cut.html, 3 pages.

Flock and Flocking—understanding the process, internet publication initial date unknown, printed Aug. 28, 2008, http://www.swicofil.com/flock.html, 6 pages.

The Fuzzy Print—Understanding the Flocking Process, D. Drehle, Mar. 1, 2001, Images, The Journal for Textile Screenprinting, Embroidery and Garment Decoration, internet edition.

* cited by examiner

TEXTURED COMPOSITE MATERIAL

FIELD OF THE INVENTION

This invention relates to a composite material having a textured surface and which can be used to provide a finished, outer cover for various substrates. More specifically, the invention relates to a textured composite material having a fibrous outer layer, an adhesive layer and an optional backing layer suitable for covering floors, walls, automotive interior surfaces and the like.

BACKGROUND OF THE INVENTION

Solid surface cover materials used in flooring or interior walls include rigid surfaces such as wood, metal, marble or ceramic tile, and resilient surfaces such as vinyl or rubber. They are simple to keep clean and have less of a problem harboring bacterial growth than do textile products. However, solid surface cover materials lack the softness and the textile quality of carpets and textiles.

Flooring products such as tufted, knit, knotted or woven carpets, and upholstery or interior wall coverings such as velours or velvets, provide abrasion and wear resistance, as well as cushion and a soft textile hand, by anchoring fibers onto a backing and holding them upright, e.g., as in pile carpet. Compared to rigid solid surfaces, these textile upright oriented fiber products are less durable, tend to collect dust and dirt, provide spaces that allow the growth of bacteria, and are difficult to clean and sanitize.

Hybrid structures, with partially fibrous and partially solid faces such as those disclosed by Petry U.S. Pat. No. 3,943,018, have also been developed. These reduce but do not eliminate the limitations of regular tufted, velours, or flocked textile surfaces.

Attempts have been made to provide flat or profiled, e.g., sculpted surfaces consisting of fibrous layers impregnated with a plastic matrix. For example, see Goldstone U.S. Pat. No. 4,035,215 and U.S. Pat. No. 4,098,629, and Zafiroglu U.S. Pat. No. 6,063,473. Generally, such products have surfaces with a semi-fibrous feel and spaces between the fibers may be sufficiently sealed to prevent bacterial penetration and dirt collection. They also provide somewhat higher abrasion resistance than regular upright-oriented fiber structures. These products are largely have a stiff leathery appearance rather than a textile feel. Also the cost of preparing dimensionally-stable dense fibrous products, combined with the cost of impregnating and heat setting can be very high.

Other techniques have been tried to produce inexpensive, dirt and bacterial growth resistant, abrasion resistant surface covering materials with a textile fiber appearance. Gregorian U.S. Pat. No. 3,860,469 discloses flat or textured film-like skins placed on top of a pile-like surface. These products combine the qualities of carpet with the solidity of vinyl or rubber, but lack the textile quality and aesthetics of carpets.

Another tactic has been to assemble a basically flat textile fabric over a sublayer of adhesive backed with various layers of sub-surface reinforcement. WO 9919557 utilizes a woven face fabric backed by reinforcing layers. Vinod U.S. Pat. No. 5,965,232 discloses a decorative fabric attached to dimensionally-stabilizing or cushioning layers. The fabric is further surface-stabilized. Laminates having a flat fabric face tend to delaminate and/or fray at the edges unless the fabric is thoroughly impregnated with adhesives. However, such impregnation adversely affects the textile feel and cushioning quality of the laminate.

Despite these and other advances in the surface covering material art there remains a need to provide a cover material that has all of the properties of abrasion and edge fray resistance, thermal, structural and dimensional stability, good barrier to dirt and bacteria, together with soft textile hand, cushioning quality, and appearance characteristics extending over a full spectrum of tufted, knit, woven or velour products.

SUMMARY OF THE INVENTION

Accordingly, the present invention provides a textured composite material comprising a fibrous outer layer comprising fibers, and an adjacent adhesive layer in which the composite material is defined by a surface area comprising (i) depressed areas within which all the fibers of the outer layer are fully embedded in the adhesive layer, and (ii) elevated areas within which a major fraction of the lengths of the fibers of the outer layer are substantially free of inter-fiber bonding by the adhesive layer, and in which fibrous outer layer more than half of the fibers are included in chains of one or more fibers that define two chain ends, such that the chain ends extend into two depressed areas and the chain between the chain ends is within an elevated area that separates the two depressed areas.

There is also provided a textured composite material as just described which also includes a backing layer adhered to the side of the adhesive layer opposite the fibrous outer layer. In another aspect the invention provides a textured breathable barrier layer of a vapor transmissive, liquid permeation resistant material between the adhesive layer and the backing layer.

The present invention still further provides a method of making a textured composite material comprising the steps of (a) providing a web of fibers, (b) placing a layer of activatable adhesive uniformly on a side of the web, (c) compressing the web and adhesive layer between an embossing tool having a plurality of protrusions directed toward the web and an opposing backup tool, thereby forming (i) depressed areas where the protrusions contact the web and adhesive layer and (ii) elevated areas where the web is free of contact with the protrusions, (d) activating the adhesive in contact with the protrusions such that all of the fibers within the depressed areas become embedded in the activated adhesive, and (e) relieving compression of the web and adhesive thereby forming a composite material having a three-dimensional texture in which more than half of the fibers of the fibrous outer layer extend into at least two depressed areas separated from each other by at least one elevated area.

Yet further there is provided a textured composite material formed by a method comprising the steps of (a) providing a web of fibers adapted to form an outer fibrous layer of the textured composite material, (b) depositing a layer of activatable adhesive uniformly on a side of the web, (c) compressing the web and adhesive layer between an embossing tool having a plurality of protrusions directed toward the web and an opposing backup tool, thereby forming (i) depressed areas where the protrusions contact the web and adhesive layer and (ii) elevated areas where the web is free of contact with the protrusions, (d) activating the adhesive in contact with the protrusions such that all of the fibers within the depressed areas become embedded in the activated adhesive, and (e) relieving compression of the web and adhesive to activate the adhesive, and (f) forming a composite material having a three-dimensional texture in which more than half of the fibers of the fibrous outer layer are included in chains of one or more fibers that define two chain ends, such that the chain ends extend into two depressed areas and the chain between the chain ends is within an elevated area that separates the two depressed areas, and in which the fibers in the elevated areas are substantially free of inter-fiber bonding by the adhesive.

DETAILED DESCRIPTION

Figure 1:
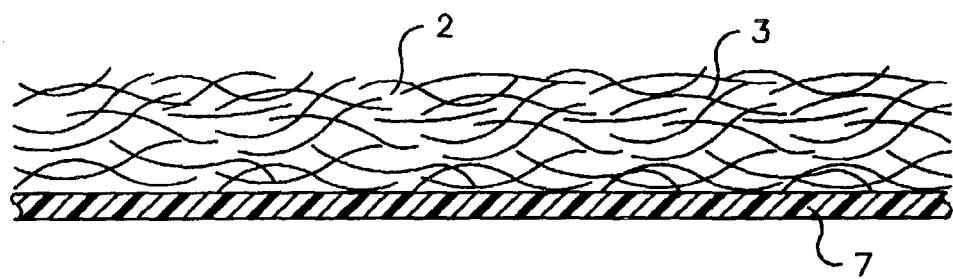
FIG. 1 is a section view of a precursor structure for a textured composite material having two layers according to an embodiment of this invention.

In a basic embodiment, the present invention is a three-dimensional textured composite material having a fibrous outer layer and an adhesive layer affixed to the underside of the fibrous layer. This basic embodiment is sometimes called a "two-layer" embodiment. In a preferred embodiment, occasionally referred to as a "three-layer" embodiment, the composite material further includes a backing layer that is adhered to the side of the adhesive layer opposite the fibrous outer layer. In other variations of the novel composite, the two- and three-layer embodiments can also optionally include additional layers, such as reinforcing layers, liquid barrier layers, dust, dirt and/or microbial barrier layers and the like.

In all embodiments, the fibrous outer layer and adhesive layer are deeply pattern-embossed to form the three dimensional texture which is characteristic of the novel product. The term "three-dimensional texture" is used herein to mean that the exposed side of the composite material is defined by so-called "depressed areas" and "elevated areas". More specifically, within the depressed areas, activated adhesive surrounds, embeds and thus spatially anchors substantially all of the fibers of the fibrous outer layer. Due to compression and embedding of the fibers in activated adhesive, the depressed areas are primarily thin, flat and substantially oriented in a so-called "x-y" direction, i.e., parallel to the plane of the composite. By "substantially" is meant that the depressed areas are largely but not wholly planar and that the depressed areas are close but not perfectly parallel to the composite plane. The outer layer fibers in the elevated areas located between the depressed areas are largely devoid of activated adhesive. In regions near the peak of the elevated areas, the fibers are particularly disengaged from activated adhesive, i.e., the fibers are not stuck together. Accordingly, the elevated portions of the outer layer fibers are free to move relative to other fibers in the same elevated area. This movement, of course, can be somewhat limited by inter-fiber entanglements or by limited fiber interbonding due to fabric configuration as will be explained in greater detail, below. Elevated area outer layer fibers also can be limited by occasional inter-fiber bonding.

Optionally, fibers on the side of the fibrous outer layer facing the adjacent sub-layer of the composite can be thoroughly bonded together to provide additional stability. This may be the case, for example, when a fibrous web or fabric used for the outer layer is supplied with a sprayed on adhesive coating applied on one face (which is to be placed against the next adjacent layer of the composite) prior to fabricating the composite. However, this bonding on the face does not penetrate deeply into the fibrous outer layer. Consequently, the fibers of the outer layer within the elevated areas are not affected by the facial bonding and are free to move relative to each other as explained above. Thus despite facial bonding, the fibrous outer layer in the elevated areas retains an excellent textile feel.

In a preferred aspect of this invention, many neighboring outer layer fibers are adhered to each other by activated adhesive for a short distance of the fiber lengths extending from the peripheral edges of the depressed areas toward the elevated areas. Fibers in these regions are referred to as "adhesive clustered" to distinguish from fully adhesive-embedded fibers within the depressed areas. Also, the amount of inter-fiber adhesion of the adhesive clustered fibers is much greater than the occasional inter-fiber bonding that can be present in the elevated areas.

The short lengths of adhesive-clustered fibers are oriented in directions substantially normal to the plane of the composite, which is sometimes referred to as the "z" direction. "Substantially normal to the plane of the composite" means that the fibers have a characteristic orientation which is close to, but not necessarily perfectly perpendicular to, the plane of the composite. Typically, the adhesive-clustered fibers will be less than 45 degrees, and often less than about 30 degrees from perpendicular. Due to the inter-fiber adhesion in these z-direction oriented adhesive clusters, the fiber segments extending from the adhesive clusters into the elevated areas have a prominent upstanding loop-like conformation. That is, the loops are anchored in a first depressed area, ascend in the z direction from an adhesive cluster, bend through the elevated area where there is little adhesive in the fiber interstices, descend into another adhesive cluster and embed in a second depressed area to form the loop.

The freedom of movement of fibers in the elevated areas allows the textured composite to retain a good amount of feel and hand of the fiber component. The depressed area anchoring feature in a two-layer embodiment provides enhanced surface stability, breaking strength and resistance to abrasion. The term "surface stability" means durability of the composite to maintain its texture. Additionally, in a three-layer embodiment, the adhesive anchoring of the outer layer fibers to the backing layer in the depressed areas further enhances the ability of the whole composite to retain its mainly planar conformation in response to ambient temperature and humidity changes. Z-direction oriented loops resulting from adhesive clustering at the edges of the depressed areas simulate the plush textile feel and sculpted appearance of pile fiber structured fabric. The three-dimensional texture thus provides the novel composite with a high quality textile fabric appearance, softness and feel to the exposed surface of the material. Moreover, it is thought that the z-direction orientation of the loops as stabilized by anchoring in the depressed areas contribute abrasion resistance.

FIG. 1 illustrates a precursor structure for a two-layer embodiment of this invention which includes a fibrous outer layer 2 and an adhesive layer 7 adjacent to the fibrous outer layer. The fibrous outer layer is shown to be formed of individual fibers 3 placed in a nonwoven web. This is only a schematic representation of the fiber structure and is not meant to limit the structure of fibrous outer layer material that may be utilized. In practice, any construct of the fibrous outer layer as is described below in greater detail can be used.

Figure 2:
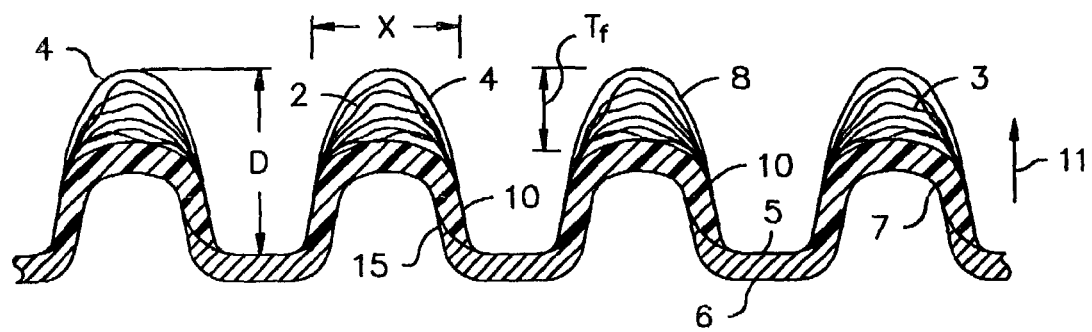
FIG. 2 is a section view of a textured composite material according to this invention formed from the precursor structure of FIG. 1.

FIG. 2 shows a section of the novel two-layer textured composite material formed from the elements juxtaposed in FIG. 1. In the drawings, identical parts are given the same reference numbers. The exposed surface 8 of the material is characterized by a plurality of elevated areas 4 which are separated from each other by depressed areas 5. All of the fibers 3 of the fibrous outer layer 2 that are within the depressed areas 5 are fully embedded into the adhesive layer 7. The adhesive 6 within the depressed areas 5 is activated by the composite formation process as will be further explained. Consequently, adhesive is in an activated state and forms an integrated solidified mass such that substantially the entire lengths of the fibers of the fibrous outer layer in the depressed areas are surrounded and bonded together by the activated adhesive. Most, and preferably, all of the interstitial space between the fibers in the depressed areas is filled with adhesive layer material. Thus the fibers are bound together and are spatially anchored to the composite in the depressed areas.

FIG. 2 also illustrates that activated adhesive extends to fibers in adhesive-clustered regions 10 for a short distance along the fiber lengths extending from the edges of the depressed areas toward the elevated areas. The adhesive-clustered fibers are oriented substantially in the z direction which is indicated by the arrow 11. Thus the fiber segments in the elevated areas have a prominent upstanding loop-like conformation.

Figure 3:
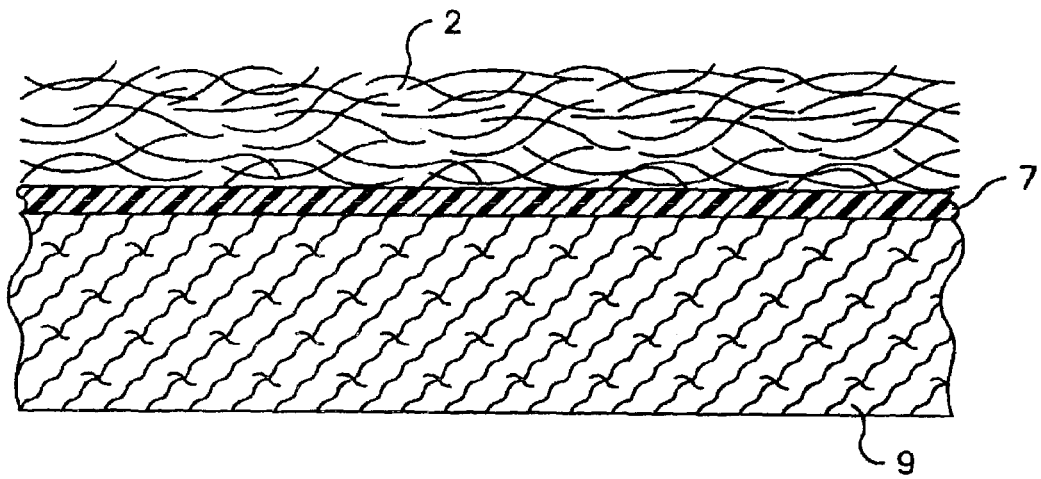
FIG. 3 is a section view of a precursor structure for a textured composite material having three layers according to an embodiment of this invention.
Figure 4:
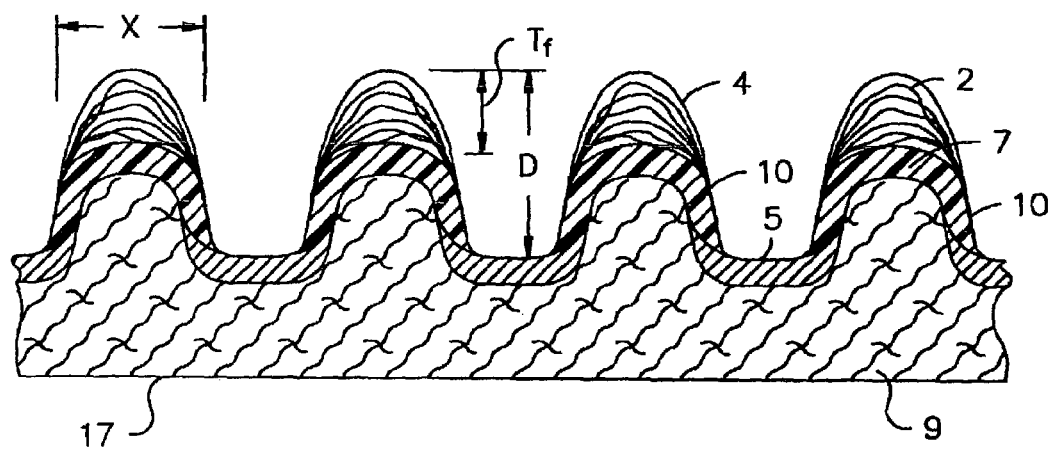
FIG. 4 is a section view of a textured composite material according to this invention formed from the precursor structure of FIG. 3.

FIG. 3 illustrates a precursor structure for a three-layer embodiment of this invention which includes a fibrous outer layer 2 and an adhesive layer 7 adjacent to the fibrous outer layer and a backing layer 9 adjacent to the adhesive layer on the side opposite to the fibrous outer layer. A section of the novel textured composite material formed from this precursor structure is seen in FIG. 4. During the composite formation process the adhesive activates to bond to the backing layer 9 to the fibrous outer layer 2

Generally, within the elevated areas 4 a major fraction, that is more than half of the length of the fibers, are substantially free of contact with the adhesive. When the composite is formed to include z direction oriented adhesive cluster regions 10 a majority of the fibers in these regions will be bound by the activated adhesive and thus constitute an exception to this generally adhesive-free fiber condition. By substantially free of contact is meant that the fibers can have small amounts of adhesive on parts of their fiber lengths and occasionally groups of individual fibers can be stuck together in the elevated areas by this adhesive. In contrast with the depressed areas 5, interstitial space exists between fibers of the outer layer within the elevated areas 4. Notwithstanding the minor amount of permissible inter-fiber adhesion in the elevated areas, the fibers remain largely devoid of adhesive from the adhesive layer, and therefore, are free to move relative to each other.

It should be observed that in some embodiments, the fibrous outer layer can be formed from nonwovens in which the fibers are bound to each other at fiber cross over points. For example, the fibrous outer layer can contain certain low-melting fiber or powder components which may or may not be activated prior to the embossing operation utilized to form the textured composite. Prior to or during the embossing operation these low-melting components can be activated to form bonds between fibers in the elevated areas. Nevertheless, the majority of the fiber lengths within the elevated areas are free of contact with adhesive.

Figure 13A:
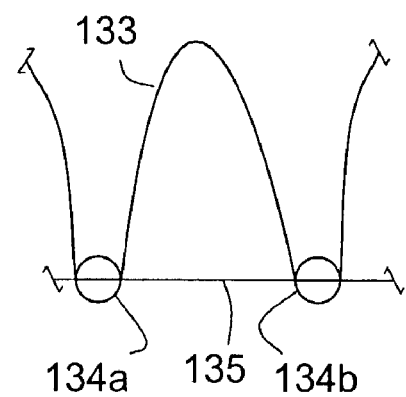
FIG. 13A is a schematic section view of a fibrous outer layer of an embodiment of the novel textured composite material.
Figure 13B:
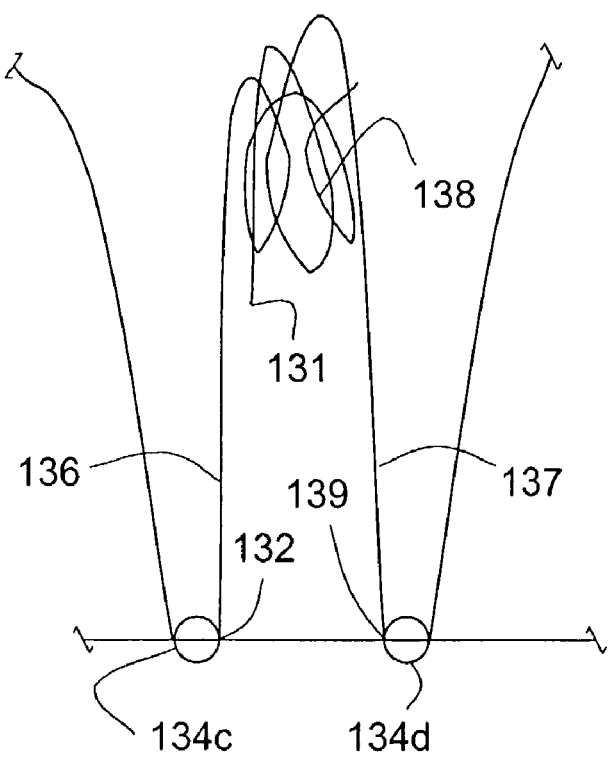
FIG. 13B is a schematic section view of a fibrous outer layer of another embodiment of the novel textured composite material.

The fibrous layer can also comprise non-entangled fibers and/or woven, knitted or other fabrics in which individual fibers or groups of fibers, i.e., yarns, are interbonded or woven together, entangled, or otherwise mechanically inter-entangled. This is illustrated schematically in FIGS. 13A and 13B. In the former, two adjacent depressed areas 134a and 134b, represented by circles, are separated by an intervening elevated area 135, represented by a horizontal line. A single fiber 133 is shown fully embedded within and thus anchored to depressed area 134a. This fiber extends in the z-direction through the elevated area 135 and returns as a continuous filament to be embedded in depressed area 134b. In comparison a portion of a woven, knitted or otherwise fiber-entangled or interbonded fabric structure is seen in FIG. 13B to include a first fiber 136 embedded in depressed area 134c. This fiber extends in the z-direction where it becomes entangled by a free-end at entanglement 138 or by an inter-fiber bond or in a knitted-loop (not shown), with a second fiber 137. The second fiber also extends in the z-direction from an adjacent depressed area 134d. Thus fibers 136 and 137 form a chain that has two chain ends 132 and 139 which is linked by the entanglement or interbond 138. In other contemplated variations, third, fourth or more fibers can be linked in the chain with fibers 136 and 137 by additional entanglements, interbonds or loops. The three-dimensional texture structure of this invention is preferably achieved by having both ends of most fibers that form an elevated area be embedded in the adjacent depressed areas as in FIG. 13A. However, the three-dimensional texture structure is contemplated to also embrace the situation of FIG. 13B in which the individual fibers within the outer fibrous layer are linked in chains to other fibers by interbonding and/or entanglement and that the ends of these interbonded and interentangled fiber chains are fully embedded in adjacent depressed areas. To the extent that such fiber inter-bonding or interentangling is present, it can restrict the relative motion of the fibers in the elevated areas.

However, this interfiber bonding and entanglement should not restrict fiber motion to such extent that the textile feel or other beneficial properties of the composite, such as abrasion resistance, are significantly adversely affected. Additionally, the adhesive from the adhesive layer should change only very little the freedom of motion of the majority of the fibers in the elevated areas from the degree of mobility intrinsic in the fiber structure utilized for the fibrous outer layer.

FIGS. 2 and 4 further schematically illustrate that the undulating path of the fibers from one depressed area to the adjacent elevated area which forms a pile-like loop and continuing to the next depressed area and so on. The undulating path can be characterized as resulting from more than half, and preferably all of the fibers in the fibrous outer layer having a length that extends into at least two isolated depressed areas. Ideally the lengths of each fibrous outer layer fiber should extend into more than two isolated depressed areas. By "isolated" is meant that the depressed areas are separated from each other by an elevated area. More preferably, most ends of non-interentangled and non-interbonded fibers(e.g., other than end 131 in FIG. 13B) should be embedded into the adhesive layer of the depressed areas. That is to say all but a few fiber ends are directly anchored in the depressed areas or connected by interbonding or entanglement with fibers ends that are anchored. Only a small number of fiber ends are free in the elevated areas.

Figure 5:
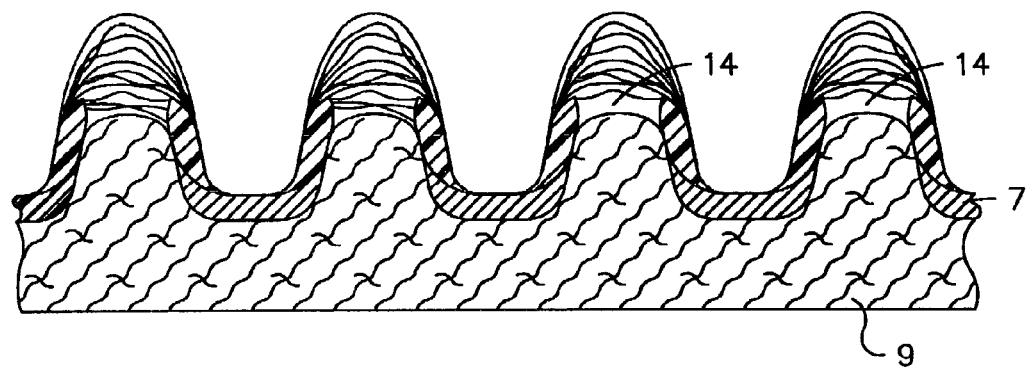
FIG. 5 is a section view of a different embodiment of a textured composite material according to this invention.

In another contemplated embodiment seen in FIG. 5, discontinuities 14 can be created in the adhesive layer 7 during fabrication. Such a discontinuous adhesive layer can occur when the adhesive utilized to form the layer is a thermoplastic sheet that shrinks and splits between depressed areas from exposure to the thermal embossing steps of the composite manufacturing process. Similarly, powder or thermosetting adhesive layer discontinuities can form when heat from the embossing tool is so insulated by the intervening bulky fibrous outer layer that the powder adhesive or thermosetting paste adhesive in the elevated areas does not activate The unactivated forms of these adhesive types typically are not sufficiently expandable to conform to the undulating contour of the adjacent surface of the backing layer 9. The adhesive layer thus tends to separate under the elevated areas.

In a further aspect of the novel composite material, the elevated areas define characteristic elevation distances, D (FIGS. 2 and 4). Elevation distance D is calculated as the difference in height in the Z direction between the peaks of the elevated areas and the neighboring depressed areas. Thickness $T_f$ of the fibrous outer layer in the finished product is another defining parameter of the composite. This parameter is measured as the maximum distance in the z direction between the exposed surface of the fibrous outer layer and the adjacent surface of the next underlying layer of the composite. Usually, the maximum distance between the uppermost and lowermost extents of the fibrous outer layer occurs at the peak of the elevated area. By comparison, the thickness of the fibrous outer layer in the depressed area is much less than $T_f$. Preferably the depressed area thickness is less than 25% of $T_f$, and more preferably less than 10% of $T_f$. The thicknesses of the fibrous layer in the elevated and depressed areas can be measured by cutting the composite in the z-direction to expose a section as exemplified in the figures. The distances defining the thicknesses can be determined with calibrated optical instruments.

The three dimensional texture is further characterized in that the elevation distance D is greater than the thickness $T_f$ of the fibrous outer layer in the elevated areas. Preferably, the ratio of D to $T_f$ is greater than about 1.25, more preferably greater than about 1.5, and most preferably greater than about 2.0.

With reference to FIG. 2, it is seen that a novel two-layer composite in which D is greater than $T_f$ will have an undulating reverse side 15. The undulations on the reverse side occur when the adhesive layer is thin, that is, less than about 0.12 mm (5 mils). When a thicker adhesive layer is utilized an undulating reverse side will occur when a deep probing embossing tool and a soft, impressionable opposing tool are used during composite fabrication to be explained in detail, below. In circumstances which utilize less deeply probing embossing tools and/or thicker composite sublayers, e.g., as in FIG. 4, the reverse side of the composite will retain a largely flat profile 17.

It is another feature of the novel composite that the density of the fibrous outer layer in the product composite, i.e., number of fibers per unit volume of the elevated areas is high. The fibrous outer layer stock can be an innately low density material such as nonwoven web, warp, woven or knit fabric, i.e., the innate stock density is less than about 0.2 g/cm$^3$. For such innately low stock density material, the desired high product density is achieved by maintaining the lateral distance X (FIG. 4) between adjacent isolated depressed areas quite small. Preferably, distance X should be about 1.5-10 mm, more preferably about 1.5-4 mm. Other fibrous outer layer stock can have an innately higher density above about 0.2 g/cm$^3$. Examples of such stock material includes densely knit and stitched fabrics. For these innately high stock density materials, the desired high product density is achieved by causing the depressed areas to be spaced apart such that the distance in the x-y direction between every point within the elevated areas is less than 20 mm from a depressed area.

The combination of high D/$T_f$ ratio and small value of X helps to assure that the textured composite material has superior resistance to abrasion and deformation even though the fibers in the elevated areas are substantially free of activated adhesive. Moreover, D/$T_f$ ratio, X and the stock material innate density should be selected to provide a density of the fibrous outer layer of greater than about 0.2 g/cm$^3$. By itself or in combination with a suitable adhesive layer, this high density also provides a good barrier to dust and bacteria which allow convenient cleaning and sanitizing of the composite. By anchoring the fibers of the fibrous outer layer at small intervals, abrasion resistance, and thus durability of the composite are increased to superior levels.

Many conventional laminar fabric composites can develop a bumpy terrain caused by so-called "doming" and "cupping". Doming is a rising upward in the z-direction from a flat support in the center of a portion of the composite caused by expansion of an upper layer relative to an underlying layer. Cupping is a rising upward in the z-direction from a flat support at the periphery of a portion of the composite caused by a contraction of an upper layer relative to an underlying layer. The undulating path of fibers seen in FIGS. 2 and 4 causes the elevated and depressed areas to deform during changes in temperature and humidity such that the novel textured composite material tends to keep its overall planar appearance. Thus this invention provides a composite having a general resistance to cupping and doming. Incorporating a suitable backing layer can impart to the composite improved resistance to cupping and doming. By selecting a backing layer of a material which itself has an intrinsically strong resistance to z-direction deformation caused by humidity and temperature changes the composite can be made more cupping- and doming-resistant. However, if the fibrous outer layer tends to shrink or expand in response to temperature and humidity changes to greater extent than the backing layer, the composite may still exhibit some doming or cupping.

Resistance to deformation from thermal and humidity changes can be determined with a dimensional stability test, as follows. A 20.3 cm×20.3 cm (8 inch×8 inch) square sample of material to be tested is placed on a flat surface in an oven at 80° C. The sample is kept in the oven for 1 min. The sample is taken from the oven and allowed to cool to room temperature for 30 minutes. The cooled sample is immersed in water and permitted to dry in a horizontal orientation on a flat surface for 48 hours at room temperature. The sample is examined for doming, and cupping. Measurements of vertical offset between the center and the edge of the sample are made immediately prior to removing the sample from the oven, at the expiration of the 30 minute cooling period and at the end of the 48 hour drying period. Less than about 4 mm vertical deflection from horizontal is considered to demonstrate absence of doming or cupping.

In one aspect, the three-dimensional texture of the fibrous outer layer can be formed without the application of heat. For example, the outer layer can be formed of various knits, spunlaced or needle-punched nonwovens and stitch-bonded fabrics. The desired three-dimensional texture, i.e., elevated areas of substantially non-adhered fibers isolated from each other by depressed areas of adhesive-impregnated fibers, can be formed from such products by using thermosetting adhesives which activate at room temperature, for example.

In a preferred aspect the three-dimensional texture of the fibrous outer layer is formed by a thermal operation such as thermal embossing. To accomplish this, the fibers in this layer should be extensible in the x-y directions under the stress applied during the embossing at elevated temperatures. Upon heating above a softening temperature, such outer fibrous layer will elongate while maintaining fiber form and upon subsequent cooling it will assume its remolded configuration. The fibrous outer layer can also be composed exclusively or in part by materials such as knit, spunlaced, needle-punched and stitch-bonded fabrics. Such materials are intrinsically extensible in the x-y direction even when the fibers of such materials are not extensible. Other fibrous structures that can be laminated into the three-dimensional textured surfaces of this invention include unbonded filaments, staple webs, warps of textured yarns, fibers with fibrils or pulps, such as extensible spunlaced woodpulp/polyester composite fabrics, and the like.

The fibers of the fibrous outer layer should be of a substance that melts at significantly higher temperature than the activation temperature of the adhesive layer composition. Preferably the temperature differential should be greater than about 20° C., more preferably greater than about 50° C. and most preferably greater than about 100° C. Use of high melting temperature polymeric materials for the fibers is advantageous because it permits utilizing thermoplastic adhesive compositions that activate at higher temperatures. It also provides a composite that can function in higher temperature service environments. A low melting temperature fiber composition calls for use of a still lower activation temperature adhesive composition. The maximum product service temperature will then be limited by the adhesive activation temperature. Preferably the melting temperature of the fibers should be at least about 150° C. Fibers of thermoplastic synthetic polymer materials are preferred. Representative examples of polymers for the fibers include polyesters, polyamides, polyaramids and combinations thereof. Polymers melting below 150° C., such as polyethylene and other polyolefins, can be used provided that the adhesive composition has a suitably low melting temperature and that expected service temperature is sufficiently below the adhesive melting temperature as to preserve product functionality. Also, thermosetting adhesive compositions that activate at low temperatures and are stable up to the fiber melting point can be utilized in combination with low melting fiber compositions. Natural fibers such as cotton and wool can be used either free of, or blended with, synthetic polymer fibers.

Examples of fibrous outer layer stock suitable for use in this invention include any entangled nonwovens such as mechanically entangled (e.g., needle punched) and hydraulically entangled (e.g., spunlaced) products, spunbonded polyester nonwovens such as product sold under the tradename REEMAY® spunbonded polyolefin fabrics such as TYPAR® fabric, and spunbonded polyamide such as CEREX® spunbonded nylon fabric. Staple nonwovens containing low-melt thermoplastic binders are also suitable. Knit fabrics that are moldable can be used as well. Woven fabrics that are loosely woven such that they can shift and deform significantly with localized pressure are also suitable. That is, woven fabric of textured filament or staple yarns having warp and weft densities of less than about 20 yarns per inch can be used.

Preference for use as the fibrous outer layer is given to conformable stitch-bonded and gathered fabrics which utilize elastic or thermally shrinkable yarns, such as XYMID® stitch bonded fabric.

Other acceptable fibrous outer layer compositions are fabrics woven, stitched or knit with elastic or partially drawn, i.e., "partially oriented yarn" or "poy" stretchable years. Typically the fibrous outer layer basis weight is in the range from about 0.07-0.5 kg/m$^2$ (2 to 15 oz/sq. yd.). Fiber deniers may range from microfibers, that is, less than $1.11 \times 10^{-7}$ kg/m (1 denier) per filament to about $28 \times 10^{-7}$ kg/m (25 denier) per filament. Preferably at least about 50 wt. % of the fibers in the fibrous outer layer should be at least $3 \times 10^{-7}$ kg/m (3 denier) for improved abrasion resistance.

Surface characteristics of the fibers used in the fibrous outer layer can affect the adhesion between this layer and the adhesive layer. Preferably, the fibrous outer layer material presents a somewhat rough surface toward the adjacent adhesive layer such that a strong bond with the adhesive can easily be formed. For example, gathered fabrics and fabrics of highly textured yarns with many fiber loops or ends emerging at this surface are well suited for the fibrous outer layer in this respect. Tightly woven, knit or highly-bonded, and surface-bonded spunbond filament nonwoven fabrics may present such a smooth surface to the adhesive layer that good bonding can be difficult. Tight weaves, especially those using non-textured, straight-filament yarns can also present adhesion problems. The reduced adhesion from such smooth-bottomed materials can be overcome by roughening the surface of the fibrous outer layer facing toward the adhesive layer. This can be accomplished by sanding or brushing the outer layer undersurface to raise ends or loops. In contrast, gathered fabrics with loopy surfaces can be used as formed without the need to further roughen their surface.

A textured composite having multiple fibrous outer layers is also embraced by this invention. Porous thin fabrics, lightweight webs, open arrays of textured yarns and the like can be superposed on other fibrous layers and co-anchored at the depressed areas to provide special decorative effects.

The adhesive layer can be thermoplastic or thermosetting composition. Adhesive in particulate or liquid forms that can be applied to the fibrous outer layer by dusting, spraying, dipping, painting, roller coating or similar appropriate conventional method is contemplated. However, the adhesive composition is preferably provided as a continuous layer coextensively underlying the fibrous outer layer. This configuration advantageously facilitates formation of the three-dimensional texture of the outer layer because it assures that the tips of the embossing tool will always contact areas in which the adhesive is adjacent to the outer layer fibers. In another preferred aspect, the adhesive composition can be selected to have barrier properties that effectively prevent transmission of liquids. Thus the adhesive layer can be adapted to block spilled liquid from penetrating to the optional underlying backing layer and further to the environmental surface covered by the textile composite material. This enhances the ability to clean the cover material, to resist bacterial growth and odor development beneath the composite material and to retard or eliminate degradation of the substrate. Alternatively, a liquid transmissive composition can be utilized for the adhesive layer.

Representative thermoplastic compositions suitable for the adhesive layers in this invention include polyolefins, such as polyethylene and polypropylene, and substituted polyolefins, such as vinylidene chloride. Fillers and additives can be added to the adhesive layer to modify the properties of the composite. Incorporation of fillers such as chalk increase stiffness without increasing melt viscosity. Pigments and other additives may be utilized. Polyesters and polyamides usually melt at too high at temperature for use as a thermoplastic adhesive. However, they can be modified by compounding with softer, lower-melting polymers to form a polymer alloy. These polyester or polyamide alloys have lower adhesive activation temperatures such that activation does not distort or degrade the fiber compositions used in the fibrous outer layer. Therefore the alloys can be suitable for use as the adhesive compositions.

The adhesive material is positioned adjacent to the underside of the fibrous outer layer and preferably is activated by a thermal process which forms the adhesive layer and embeds the outer layer fibers within the depressed areas into the adhesive layer. Optionally, two or more adhesive layers can be employed. Thermoplastic adhesive material can be applied as free flowing particles, such as polymer pulp, grains, powders, fibrids, fibrils, and staple fibers, as a unitary structure such as a film, in the form of unbonded fibers in a nonwoven web, or as a woven, knit or nonwoven fabric or a combination thereof. Unitary structure thermoplastic adhesive materials tend to exhibit lateral contraction when subjected to thermal processing to activate the adhesive. However, advantageously according to this invention the protrusions of the embossing tool, pin the adhesive layer in place prior to shrinking. At the same time the higher-melting fibrous outer layer somewhat insulates the bulk of the precursor adhesive layer from direct heat. This reduces or eliminates deformation due to shrinkage from occurring during composite fabrication. Optionally, the adhesive layer material can be attached to the fibrous outer layer stock and/or to the backing layer stock prior to formation of the composite. This attachment can be effected by thermal bonding, needling, stitching or similar methods that provide merely enough adhesion to keep the stock materials together as unit as they undergo composite fabrication.

Thermosetting adhesive materials can also be used. These typically are applied as pastes or relatively viscous suspensions or solutions that are applied to a side of the backing or to the underside surface of the fibrous outer layer. The thermosetting adhesive material then can be activated with heat during the embossing operation.

Care should be exercised to prevent a thermosetting adhesive from curing before the three-dimensional texture is formed in the fibrous outer layer. Fortunately in many cases, premature activation of the thermosetting adhesive is avoided because (a) heat is normally applied to the adhesive layer by the embossing tool approaching from the fibrous outer layer side of the composite, and (b) the fibrous outer layer is typically a thermally insulating material. Special attention to preventing premature onset of curing of the thermosetting adhesive is recommended for composites which comprise a very thin fibrous outer layer.

As in the case of the thermoplastic adhesives, thermosetting adhesive materials are chosen to fully surround and embed the fibers within the depressed areas. Examples of thermosetting adhesives suitable for use in this invention include starches, urethane adhesives and various so-called latex adhesives, such as the styrene butadiene rubber ("SBR") compositions commonly used in the manufacture of carpets.

In embodiments such as illustrated in FIGS. 3 and 4, the backing layer is bonded to the side of the adhesive layer opposite the fibrous outer layer, i.e., the underside of the adhesive layer. The backing layer primarily adds structural stability and, in certain embodiments, cushioning to the composite. Structural stability is enhanced by the stiffness and strength of the backing layer which allows it to resist forces that would tend to stretch and distort the composite laterally. Cushioning can be provided by utilizing a deep and resilient backing layer material. The degree of cushioning can be adjusted by selecting backing materials of different depth and resilience. For example, to achieve high cushioning quality a thicker backing layer of a very resilient, usually porous material, such as a fibrous felt with a density of up to about 0.2 $g/cm^3$ can be used. On the other extreme, the composite can be made firm by using a typically thin backing layer of comparatively less resilient material, such as a synthetic rubber with a density greater than about 1.2 $g/cm^3$.

The composition of the backing layer is not critical provided that the material has sufficient cohesive strength to endure anticipated wear from use. For example, a textured composite material used for a floor covering utility should be able to withstand the foot traffic duty cycle in the area of floor that the cover will be positioned. Also, the backing layer should be able to adhere well to the adhesive layer. Thus the backing layer can be solid, that is, void free, or porous. If porous it can be formed of fibers, foam and like substances.

The backing layer can be a monolithic block, that is, compositionally isotropic. In another aspect the backing layer can be stratified and comprise a plurality of strata. Each sublayer in the stratified backing layer can have a different composition and/or structure to achieve different degree of hardness (i.e., cushioning effect) and porosity. This technique can be used to further tailor the properties of the textured composite material. A compositionally isotropic backing layer can be stratified by methods such as treating the exposed side of the backing layer, that is, the face opposite the fibrous outer layer, with adhesive, heat, pressure and/or embossing.

In a preferred embodiment, a stratified backing layer is formed from a top sublayer, that is, adjacent to the adhesive layer, and fibrous outer layer and a bottom sublayer. The top sublayer is typically thinner than the bottom sublayer, normally being less than about 10% of the thickness of the backing layer. This top sublayer can be formed of a low melting thermoplastic composition similar to that of the adhesive layer. When the composite material is fabricated the top sublayer fuses with the adhesive layer to create a very strong bond between the backing and the fibrous outer layer. In a particularly preferred embodiment, the top sublayer of the backing can serve as the adhesive by itself and thereby anchor the fibers of the outer layer directly into the backing layer and eliminate the adhesive layer as a separate entity. In another preferred embodiment, the top sublayer of the backing layer is composed of a fibrous composition that provides good adhesion to the underside of the adhesive layer and also it is very impressionable to create tall elevated areas, i.e., having large D dimension. Particularly preferred for such top sublayers are fibrous felted layers (needle-punched) with a large number of upstanding fibers or fiber loops on their top surface. In another preferred embodiment, the backing layer consists of an elastomeric, open foam layer supported by an underlying relatively rigid bottom sublayer.

Preferably the backing layer weight should be in the range of about 0.14-3.1 kg/m² (4 and 80 oz/sq. yd) and the total thickness should be about 2-20 mm.

Figure 6:
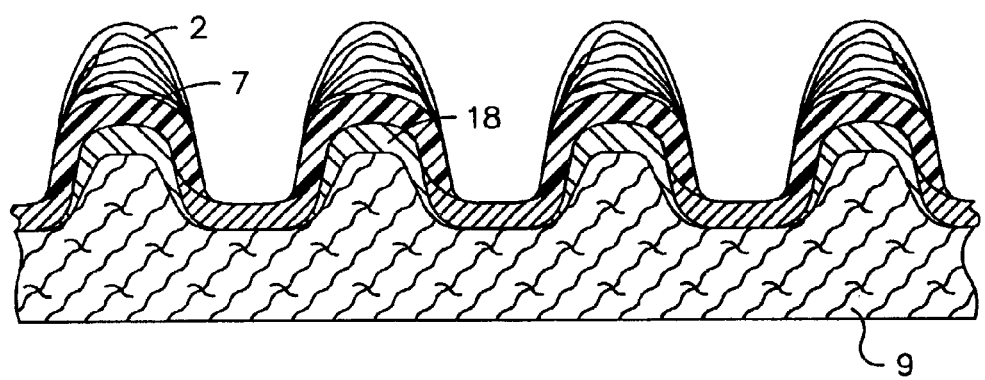
FIG. 6 is a section view of a textured composite material according to this invention in which the composite includes a breathable layer that is liquid permeation resistant and vapor transmissive.

In another aspect, the textured composite material of this invention includes an optional breathable layer 18 FIG. 6. This layer is of a composition that permits vapor transmission but is a barrier to liquids. Normally the breathable layer is utilized in conjunction with a three-layer composite and is inserted between the adhesive layer 7 and backing layer 9. Preferably the breathable layer is applied as a polymeric film that becomes bonded to the composite during the elevated area formation step of assembly. Representative materials suitable for use as the breathable layer include expanded poly(tetrafluoroethylene) ("e-PTFE" also known as GORE-TEX® fluoropolymer, polyurethane film, plexifilamentary nonwovens such as spunbond polyolefin, subdenier melt-blown polyolefin, and the like.

The novel textured composite can be readily formed by a thermal process that involves a combination of laminating and embossing. In general, the process involves providing the individual fibrous and adhesive materials and optional backing and other optional material components that will form the various layers of the composite; juxtaposing the individual components; and then compressing the components at pre-selected conditions of time, temperature and pressure to effect the lamination.

A combined laminating and embossing treatment is preferably effected by compressing the appropriately stacked layers of individual components against a deeply contoured embossing tool, such as a pressure plate, patterned calender roll or patterning belt. The embossing tool is directed toward the fibrous outer layer side of the stacked materials and presses the back of the stack against an opposing backup tool, such as a second pressure plate, roll or belt. Heat is applied during compression to activate the adhesive components and thereby effect durable joining of the individual components into an integrated composite.

Preferably, the adhesive activation and laminating heat is applied to the component layers via the embossing tool. Thus, creation of the three-dimensional texture of the fibrous outer layer and the formation of an integrated composite from individual layers occurs simultaneously. The individual and/or pre-assembled groups of stock materials, e.g., adhesive layer stock pre-attached to fibrous outer layer stock, can be pre-heated prior to bringing all of the components together for embossing to increase overall processing speed. The temperature of the pre-heating step can be high enough to soften or even activate the adhesive stock material.

Figure 7:
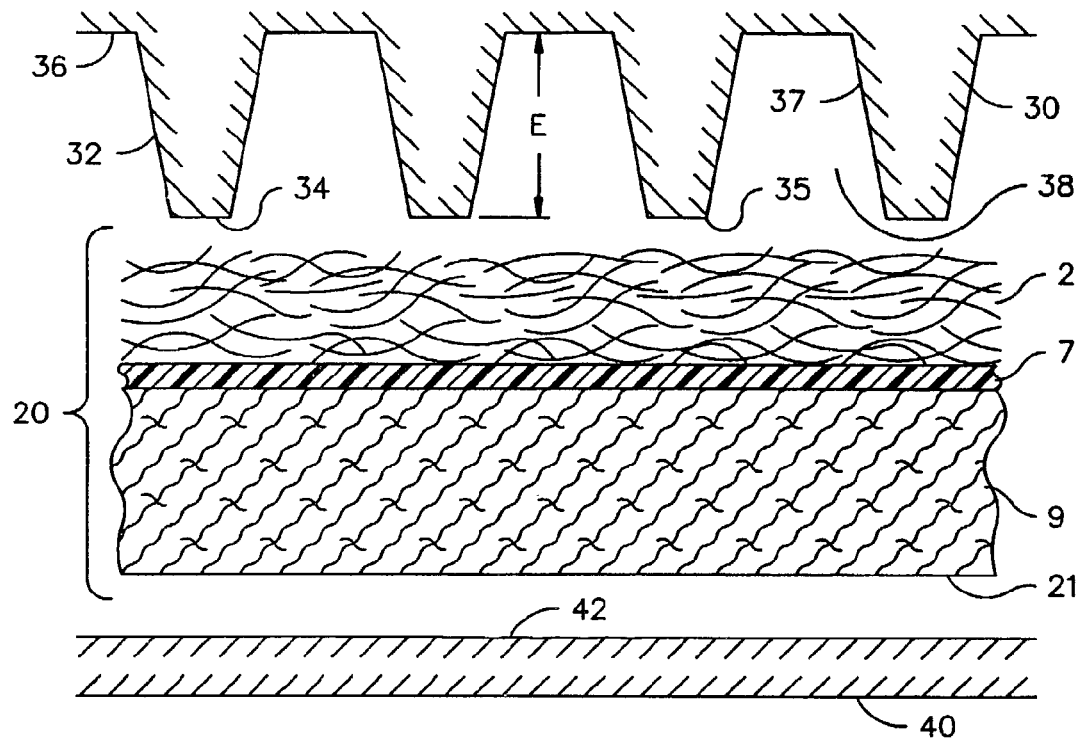
FIG. 7 is section view of a portion of a fabrication system suitable for embossing and laminating a textured composite material according to an embodiment of this invention.

Salient features of a tool adapted to perform the embossing and laminating process according to this invention can be understood with reference to FIG. 7. The figure illustrates in section view a portion of a precursor 20 of a three-layer embodiment of the novel textured composite material. The precursor comprises fibrous outer layer material 2, adhesive layer material 7 and backing layer material 9 positioned adjacent each other in the order stated. An embossing tool 30 is positioned with protrusions 32 pointing toward the fibrous outer layer material side of the precursor 20. A backup tool 40 is disposed at the backing layer side of the precursor. The backup tool has a flat working surface 42. To produce the three-dimensional textured, laminated product, the embossing tool is heated and the embossing and backup tools are moved toward each other so as to compress the precursor between the tips 34 of protrusions 32 and the face 42 of the backup tool. The method of moving the embossing and backup tools together is not critical. That is, either the embossing tool or the back up tool can be stationary and the other can be moved toward the stationary tool, or both embossing and backup tools can be mobile. In a typical installation, the backup tool is a plate, sheet or drum and the composite 20 is supported by the backup tool with the exposed inner face 21 in contact with working surface 42 of the backup tool. In such installation, the embossing tool 30 is a roll that rotates so as to force protrusions 32 into the fibrous outer layer and adhesive layers of the supported composite. Other conventional embossing machinery configurations can also be utilized.

Embossing and laminating occur as the embossing and backup tools are brought toward each other. The system is set to provide a specified clearance at point of closest approach between the tips 34 and the working surface 42. The tools are held at this clearance dimension for a duration effective to create the three-dimensional texture of the fibrous outer layer and to laminate the composite layers. Then the tools are moved apart to release the textured product. The product can be cooled while still in the nip of the embossing and backup tools by cooling the tools. Other conventional cooling techniques that can be used include separating the embossing and backup tools from contact with the laminated product, exposing the laminated product to a coolant, such as air and water, contacting the laminated product with a cold surface such as a chilled roll and any combination of these.

Protrusions 32 are spaced apart at positions on base 36 of the embossing tool corresponding to locations of desired depressed areas in the finished composite. The protrusions extend from the base toward the composite by a distance E. This distance dimension and the clearance are selected to provide a desired penetration of the protrusions into the composite such that the adhesive of layer 7 is activated at the protrusion tips. The fibers are simultaneously pushed into the activated adhesive by the tips, thus embedding the fibers within the depressed areas. Compression of the composite between the tips and the working surface causes adhesive to laminate the backing layer to the depressed areas which themselves anchor the fibrous outer layer. Tip extension dimension E is also selected to assure that fibers and adhesive in the voids 38 between protrusions do not excessively overheat and fuse together. The protrusions can have sides 37 that align normal to the plane of the composite. As seen in FIG. 7, the protrusions preferably have tapered profiles that narrow away from the base 36 and render the protrusion frustoconical or truncated pyramidal in form. The tapered geometry facilitates the formation of adhesive clusters that extend outward from the depressed areas and which orient fibers of the outer layer in a substantially z direction as earlier mentioned.

The tips 34 of the protrusions can have a variety of shapes. For example, they can be convex curved that tend to form crater-shaped depressed areas. Convex curved tips also facilitate formation of adhesive clustered fibers at the edges of the depressed areas and promote the z-direction orientation of the fibers in the outer layer. The tips can be shaped with cutting surfaces at the tip edges 35. Additionally, the tips can be sharply pointed or concave shaped. These configurations can facilitate perforation of the adhesive layer and sculpting of the backing layer as is described below.

Figure 8:
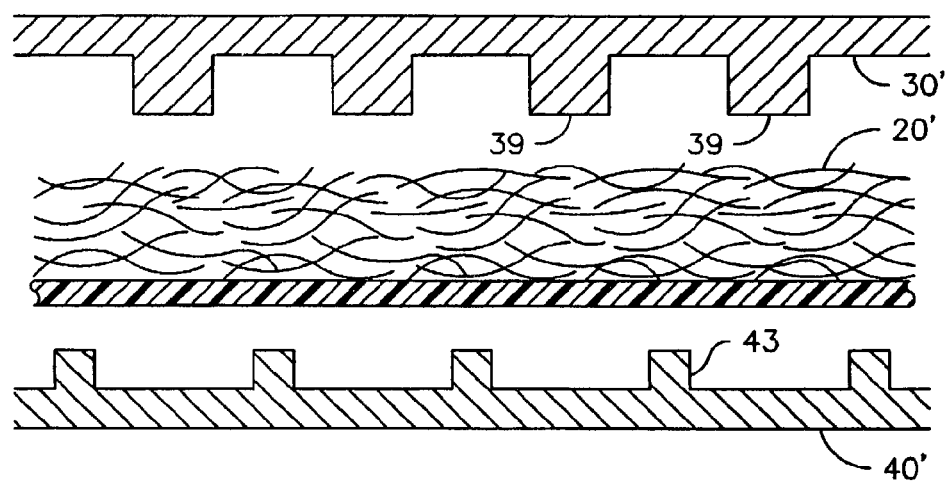
FIG. 8 is a section view of a portion of another fabrication system suitable for embossing and laminating a textured composite material according to an embodiment of this invention.

In order to create an undulating reverse side 15 of a two-layer composite (FIG. 2) or a three-layer composite having a thin backing layer, it can be helpful to provide a working surface on the backup tool that mates with the protrusions of the embossing tool in a complementary fashion. FIG. 8 schematically illustrates such a combination of embossing tool 30' and backup tool 40' which are juxtaposed on opposite sides of a two-layer composite precursor 20'. The backup tool has projections 43 which are so positioned as to bias against the reverse side of precursor laterally between the protrusions 39 of the embossing tool 30'. An undulating reverse side profile can alternatively be formed by using a flat working surface 42 (FIG. 7) provided that the the working surface is composed of an elastically deformable substance such as rubber. Thus by appropriately adjusting the clearance between the embossing and backup tools, the protrusions of the embossing tool can force the composite into temporary depressions in the deformable backup tool during the embossing step. When the embossing tool retracts after embossing, the elastically deformable working surface of the backup tool recovers to its flat conformation while the composite retains its undulating profile such as seen in FIG. 2.

The embossing tool and/or the backup tool is maintained at a suitable elevated temperature such that the adhesive activates when touched by the tips of the embossing tool protrusions. However, the thermal processing equipment should not be heated to temperatures that approach the fusion point of the outer layer fibers. Such overheating can cause the fibers in the elevated areas to bond to themselves or deteriorate to an extent that the three-dimensional texture of the outer layer is lost. In contemplated variations of the process heat can be supplied from other sources in addition to the embossing tool. For example, the backup tool can be heated, or supplemental heat can be supplied from radiation or heated gas impinging on the stacked layers prior to embossing.

The operating variables such as temperature, exposure time, pressure, and depth of protrusions can be adjusted to control the degree to which adhesive melts and penetrates between fibers. Thus, when a thermoset adhesive is utilized, heat to activate the adhesive is applied during the embossing step for a time and a temperature selected to prevent this adhesive from setting before embossing is completed. When a thermoplastic adhesive is used, warping of the finished product is avoided by causing the textured composite to cool in a flat orientation.

The tip extension dimension E should be long enough that the protrusion tips extend through the uncompressed fibrous outer layer and contact the adhesive layer without causing heat from the base of the embossing tool to melt the fibrous material, or otherwise thermally agglomerate or degrade the fibers in the elevated areas of the outer layer.

In an embodiment of this invention, the protrusions of the embossing tool extend far enough that they penetrate through the adhesive layer and into the backing layer. This has the effect of pushing the depressed areas into the backing layer and compressing the backing layer beneath the depressed areas as seen in FIG. 5.

In another contemplated embodiment, central portions of the depressed areas are removed by the embossing tool. This effect can be achieved by raising the temperature of the protrusion tips, forcing the protrusions deeper into the backing layer, providing protrusion tips with sharp cutting edges, using a compliant backup tool surface, and combinations of these techniques. A compliant back up tool can be formed from a suitably resilient, thermally stable material such as a hard rubber. With central portions removed, the outer surface of the textured composite material has elevated areas, ring-shaped depressed areas and exposed areas of backing layer material within the depressed areas.

In still another contemplated embodiment, the protrusions extend completely through the backing layer and other optional layers so as to effectively perforate the textured composite.

By causing the protrusion tips to penetrate the backing layer to various depths, diverse color effects can be given to the finished composite. If the backing layer has a color that contrasts with the color of the fibrous outer layer, the contrasting color will show through the depressed areas to the top surface of the composite. More complex color patterns can be obtained by providing multiple strata within the backing layer or multiple backing layers, each of which have different colors. The fabricator can cause the composite to exhibit a wide variety of different color patterns by selecting embossing protrusions that penetrate into different colored strata at correspondingly different depths.

The thermal embossing and laminating operation can be carried out batchwise, for example, using a platen press. This technique is useful for forming piece work textured composite such as sheets, panels and tiles. Alternatively, the heat embossing operation can be conducted in conventional continuous embossing equipment. For example, continuous embossing units provide for moving long webs of fibrous material, adhesive film and backing material simultaneously into the nip between constantly rotating embossing and back up rollers or belts. The rollers and belts are controlled to desired temperatures by conventional heating.

The novel textured composite materials are useful for covering environmental surfaces such as floors, walls, furniture and decorative objects. The three-dimensional texture of the fibrous outer layer provides an economical, abrasion resistant, dust-blocking fabric with a textile feel that can be made to simulate the appearance of loop-pile structures. With optional backing layer the composite has excellent cushioning characteristics and stability to thermal and humidity gradients which render it well suited to many carpet applications. Inclusion of an optional breathable layer additionally provides excellent ventilation through the textured composite while maintaining impenetrability to liquids. Thus the novel textured composite material can attractively cover and protect its underlying substrate from adverse effects of liquid spills.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. Example 1

Textured composite material according to this invention was prepared.

A series of textured composite materials was prepared using the following component materials. The fibrous outer layer was a needle-punched felt fabric made by carding and cross-lapping a 0.19 kg/m$^2$ (5.5 oz/yd$^2$) weight, 2.2 mm thickness felt of 3.8 cm (1.5 inch.) 1.7×10$^{-7}$ kg/m (1.5 denier) polyester fibers. Needling density was 46.5 penetrations/cm$^2$ (300 pen/inch$^2$). The adhesive layer material was a combination of two layers of black polyethylene utility film having a basis weight of 0.15 kg/m$^2$ (4.4 oz/yd$^2$). The backing layer was commercial carpet padding material of 0.88 kg/m$^2$ (26 oz/yd$^2$) of carded lapped fibers comprising 50% polyamide/50% polypropylene post consumer carpet waste. The fibers were garnetted, cross-lapped, and needled to form a backing layer having a thickness of 12.3 mm.

The composite material was formed by stacking in top-to-bottom order, the outer layer, adhesive layer and backing layer materials in a platen press. The press was equipped with a nickel upper embossing plate and a lower support plate. A diagram of a portion of the upper plate 90 is shown in FIGS.

Figure 9:
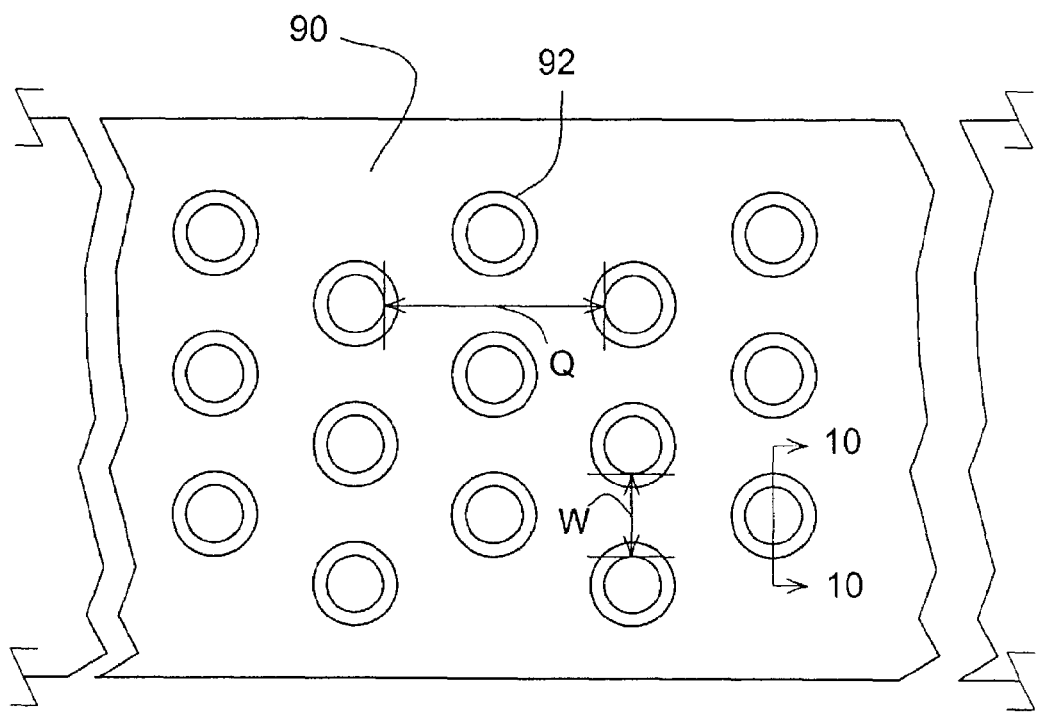
FIG. 9 is a plan view of a portion of an embossing tool suitable for fabricating certain embodiments of the novel textured composite.
Figure 10:
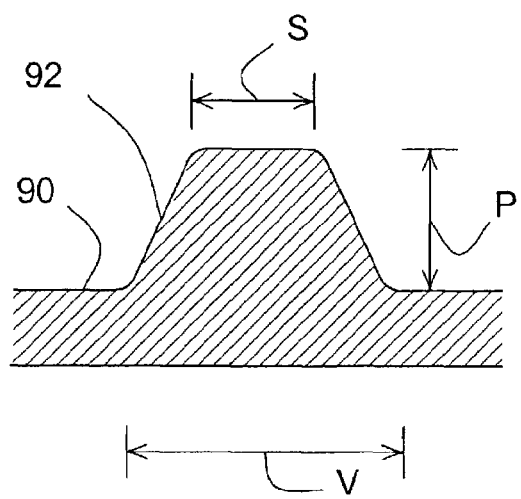
FIG. 10 is a detail section view of a protrusion of the embossing tool of FIG. 9 as viewed along line 10-10.

9 and 10. The upper plate had frusto-conical protrusions 92 as shown in FIG. 10 and arranged in a staggered pattern as shown in FIG. 9. Dimensions and spacing of the protrusions were as follows: S=2.0 mm, P=1.5 mm, V=2.5 mm, Q=5.2 mm, and W=1.6 mm.

Pressure of 20.7 MPa (3000 psi) was applied to the platens by raising the bottom plate for a short time and then quickly lowering the bottom plate to allow cooling. Plate temperature, press time and other conditions utilized are presented in Table I.

TABLE I

| Ex. | Emboss Plate Temp. °C. | Backup Tool Temp. °C. | Time Sec. | Composite Thickness mm | Elevated area Thickness Tf mm | Distance D mm | Ratio D/Tf | Comment |
|---|---|---|---|---|---|---|---|---|
| 1A | 220 | 25 | 0.5 | 10 | 0.8 | 1.27 | 1.6 | Soft cushion feel similar to dense tufted carpet. Gray colored depressions |
| 1B | 220 | 25 | 1.0 | 6.4 | 0.7 | 1.40 | 2.0 | Slightly stiff feel. Dark gray colored depressions. |
| 1C | 220 | 25 | 2.0 | 2.5 | 0.6 | N.M.* | N.M* | Stiff feel, similar to dense vinyl tile. Perforated. |

N.M.* = Not measured

Samples 1A-1C demonstrate that the texture and feel of a three-component composite can be manipulated by duration of embossing. In this progression of samples, the embossing time was increased. As a result, the thickness of the completed composite was reduced and the feel became increasingly stiffer. In Ex. 1A the black adhesive layer began to flow into the interstices between outer layer white fibers and thus produced a gray color. This effect increased in Ex 1B and made the appearance darker. In Ex 1C the tips of the embossing protrusions penetrated completely through the adhesive layer to the backing layer. Accordingly, the central portions of the depressed areas were completely removed. Dimension D from the peaks of the fibrous outer layer to the ring shaped depressed areas surrounding the central portions were not measured. Some polyolefin from the backing layer flowed upward through the central portions to the outer layer. This made the outer layer a light gray color.

Example 2

Textured composite material having a breathable, i.e., liquid permeation resistant, vapor transmissive barrier layer was produced.

Samples of textured composite material were prepared from the following materials. The fibrous outer layer was composed of 0.14 kg/m$^2$ (4.2 oz./sq. yd.) weight XYMID® Style 1817 stitch bonded fabric (Xymid LLC, Petersburg, Va.). This fabric comprises REEMAY® spunbonded polyester style 2024 which had basis weight of 0.07 kg/m$^2$ (2.1 oz./sq. yd.) and which was chain-stitched with 3.54 stitches per cm (9 counts per inch) of 14 gauge textured nylon yarn. Low melting copolymer of the REEMAY fabric was not activated. REEMAY polyester nonwoven contains low-melting copolymer that softens. Thus this fabric becomes easily deformable at temperatures over 100° C. The stitches of textured nylon yarn are stretchable by at least 50% elongation with or without application of heat.

The adhesive in Example 2A was Griltex-4 polyamide powder (EMS Company, Switzerland) of 200-500 μm particle size and having a melting point of 105° C. The powder particles were deposited at a density of 0.051 kg/m$^2$ (1.5 oz/sq. yd.) on a breathable layer of a web of meltblown polypropylene microfibers. The powder was sifted onto the web without infiltrating the web, and thereby, not blocking the breathable layer. The microfibers were 0.067-0.11×10$^{-7}$ kg/m (0.06-0.1 denier) and the web from Mogul Fabrics (Gaziantep, Turkey) had a basis weight of 0.10 kg/m$^2$ (3 oz/sq. yd.). The backing layer was the same as that in Example 1.

The materials were assembled and processed as described in Example 1 with exceptions that will be noted. The operating conditions and results are shown in Table II. The pressure of the platen press during embossing was 13.8 MPa (2000 psi). The structure of the composite was as shown in FIG. 6.

TABLE II

| Ex. | Emboss Plate Temp. °C. | Backup Tool Temp. °C. | Time sec. | Composite Thickness mm | Elevated area Thickness $T_f$ mm | Distance D mm | Ratio D/$T_f$ | Comment |
|---|---|---|---|---|---|---|---|---|
| 2A | 170 | 25 | 0.5 | 11.4 | 0.95 | 1.27 | 1.3 | Full bonds in depressed areas, partial bonds in elevated areas |
| 2B | 220 | 25 | 0.5 | 11.4 | 0.80 | 1.27 | 1.6 | Full bonds in depressed areas, no bonds in elevated areas |
| 2C | 220 | 220 | 0.5 | 12.7 | 0.80 | 1.27 | 1.6 | Full bonds in depressed areas, no bonds in elevated areas |

In Ex. 2A well formed bonds in the depressed areas were evident. The composite was sufficiently well laminated that the layers could not be peeled apart without destroying the layers. In the elevated areas, the powdered adhesive melted partially and penetrated the outer fibrous layer without reaching the upper surface of the fibrous outer layer. Despite this partial penetration, the breathable layer remained vapor permeable. Breathability was determined by providing a Mason jar having a two-part lid formed by a peripheral screw top and a removable flat disk. The disk was perforated. With the lid removed, 5 g of water was placed in the jar. A 7.6 cm (3 inch) diameter sample of the composite was then laid on the perforated disk and the peripheral portion of the top was screwed onto the jar over the disk/sample, thereby sealing the sample over the mouth of the jar. The jar was maintained at room temperature for 72 hours and the difference in weight before and after the test was measured. A weight loss of 0.1 g was deemed evidence that the sample permeated water vapor and was therefore breathable. A weight loss of 0.7 g was observed for sample 2A.

Although vapor permeable, the sample was resistant to water flow through the composite. Water flow resistance was determined by placing an approximately 2.54 cm (1 inch) diameter sample piece to be tested against the rubber washer in a 1.9 cm (3/4) diameter female connector of a common garden hose. A male garden hose connector attached to a section of hose was screwed into the female connector which clamped the sample across the lumen and thus to block flow through the hose. The assembled apparatus was oriented vertically and a 25.4 cm (10 inch) high column of water was placed in the hose on top of the sample. The apparatus was positioned over a sheet of dry blotting paper. The sample was deemed to be impenetrable to liquid if the sheet was dry after 0.5 hour of testing.

Example 2B repeated 2A except that the polyamide adhesive powder was eliminated and two layers of the polypropylene fiber web of total weight of 0.20 kg/m² (6 oz./sq. yd.) were used. Also the upper platen plate temperature was increased to 220° C. The fibrous outer layer was well bonded to the polypropylene breathable layer and the textured composite exhibited good delamination resistance by peel testing, i.e., the composite separated within layers but not at the interface between layers when pulled apart by hand. This demonstrates that the breathable layer can also serve the purpose of the adhesive layer. The low melting copolymer of the Reemay fabric was fully fused in the depressed areas and the fabric maintained its original fiber form with no evidence of melting or shrinking in the elevated areas. Liquid penetration and vapor transmission were similar to that seen in Ex. 2A.

Example 2C was conducted identically to Ex. 2A except that a web of 2.5 cm long Type K glass staple fiber was added to the underside of the backing layer, and the bottom platen plate was heated to 220° C. The finished composite of Ex. 2C was similar in appearance to that of Ex. 2B.

Rigidity and dimensional stability tests were performed on Exs. 2B and 2C by the following methods. Rigidity was determined by cutting a 2.54 cm×20.3 cm (1 inch×8 inch) strip from a sample of the composite to be tested. The strip was clamped to a horizontal surface, such as a table top, in a way that about 5 cm (2 inches) of the sample overlapped the surface and the remaining about 15 cm (6 inches) extended freely beyond the surface in cantilever fashion. The vertical deflection at the free end of the sample, i.e., the vertical distance of that the end drooped below the elevation of the horizontal surface was measured. Ex. 2B had a rigidity deflection of 5 mm and exhibited doming of 3-4 mm and cupping of 1-2 mm. Ex. 2B had a rigidity deflection of 2 mm and approximately zero doming and cupping.

Example 3

Multiple stage embossing is used to produce a varied color composite material.

Materials used to produce composite materials were as follows. The fibrous outer layer was white Reemay® type 2040 polyester spunbonded fabric, basis weight 0.14 kg/m² (4 oz./sq. yd.). This fabric is thermally moldable above 100° C. The adhesive was the same as that in Ex. 1. The backing layer was a 0.68 kg/m² (20 oz./sq. yd.) resilient felt formed from carded, cross-lapped and needle-punched polyester staple fiber at 23.2 penetrations/cm² (150 pen./inch) per side using 7.6 cm long $16.6 \times 10^{-7}$ kg/m (15 denier) per filament. The backing layer was about 0.95 cm (3/8 inch) thick. This backing layer material was stained red by contacting one side with a commercial red dye dissolved in water and then dried in and oven at 130° C. to set the dye. The dye penetrated to about one third of the thickness of the layer. The same staining procedure was performed on the opposite side of the backing layer using a dark green colored dye.

Figure 11:
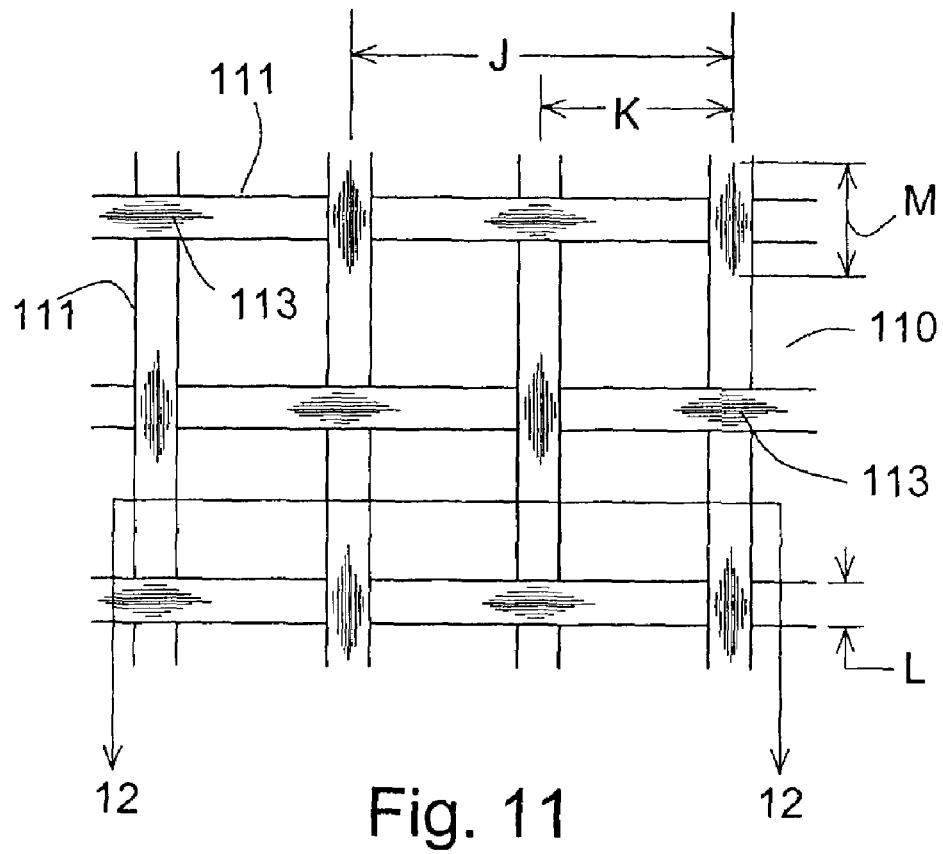
FIG. 11 is a plan view of a portion of a wire mesh embossing tool suitable for fabricating certain embodiments of the novel textured composite.
Figure 12:
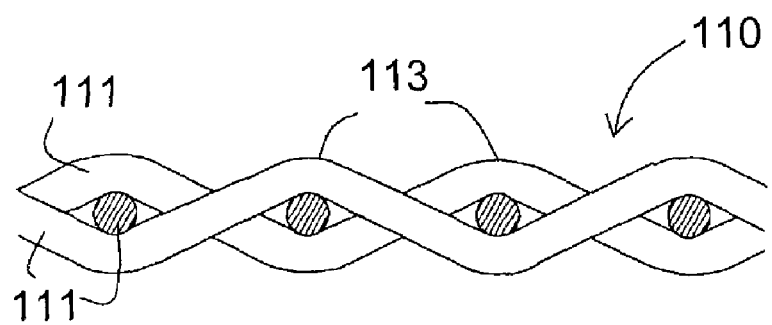
FIG. 12 is a detail section view of the wire mesh embossing tool shown in FIG. 11 as viewed along line 12-12.

The composite structure was assembled in the platen press as in the previous examples except that three patterning plates were provided. Plate A had 30 round protrusions per cm² (196/sq. inch.), and is further defined by the values for pattern dimensions in FIGS. 9 and 10 as follows: Q=2.6 mm, W=0.8 mm, S=1 mm, V=1.25 mm, and P=1 mm (40 mil). Plate B had the same embossing pattern dimensions as in Ex. 1. Plate C, illustrated schematically in FIGS. 11 and 12, was a plain weave metal screen 110 woven from 8 gauge wire 111. The screen 110 had elongated protrusions 113 alternating at 0 and 90 degrees positioned as shown in the figures with dimensions as follows: J=6.35 mm (0.25 inch), K=3.2 mm (0.125 inch), L=1.5 mm (0.06 inch), M=3.0 mm (0.120 inch) and N=2.5 mm (0.10 inch). The composites were formed by pressing the plates together with pressure of 48.2 MPa (7000 psi) at conditions shown in Table III.

The sample of Ex. 3A was first embossed with plate A for 1.5 seconds to produce an intermediate finished composite material with 0.89 mm deep depressed areas. Because of the blending of the fused adhesive with the fibers, the recessed areas took on a gray color while the fibers in the elevated areas remained white. Then the sample was re-pressed for an additional 1.5 seconds with plate B substituted for plate A. This produced a superimposed pattern of deeper depressed areas The protrusions penetrated into the backing layer and exposed dark red color in the more deeply depressed areas while the areas not touched by plate B retained colors produced by the initial pressing. See Table III.

The sample of Ex. 3B was prepared by repeating the two stage pressing procedure of Ex. 3A. Then the sample was re-pressed a third time for 1.5 seconds with plate C in the press. The third pressing formed still more deep depressed areas that penetrated farther into the backing layer and exposed dark brown color where the protrusions of plate C penetrated.

TABLE III

| Ex. | Emboss Plate Temp. °C. | Backup Tool Temp. °C. | Time sec. | Plate | Composite Thickness mm | Embossment Thickness $T_f$ mm | Distance D mm | Ratio $D/T_f$ | Comment |
|---|---|---|---|---|---|---|---|---|---|
| 3A | 220 | 25 | 1.5 | A | 8.90 | 0.35 | 0.89 | 2.2 | Depressed areas gray |
|   |   |   | 1.5 | B |   |   | 1.0 | 3.0 | Depressed areas dark red |
| 3B | 220 | 25 | 1.5 | A | 7.6 | 0.35 | 0.76 | 2.2 | Depressed areas gray |
|   |   |   | 1.5 | B |   |   | 1.02 | 3.0 | Depressed areas dark red |
|   |   |   | 1.5 | C |   |   | 1.87 | 6.0 | Depressed areas dark brown |

Example 4

Operating conditions are varied to show that adhesion and textile composite face designs can be effected by suitably adjusting control variables.

For the samples produced in this example, the fibrous outer layer was an upholstery fabric of a blend of 70% nylon and 30% cotton spun yarns with a 7.9 warp/cm×7.9 weft/inch (20×20) weave. The basis weight was 0.41 kg/m² (12 oz./sq. yd.) and thickness was about 1 mm. The adhesive layer was black polyethylene film of basis weight 0.11 kg/m² (3.2 oz./sq. yd.). The backing layer was the same as in Ex. 1. In all samples of Exs. 4, the embossing plate temperature was maintained at 200° C.

Sample 4A is a comparative example which was produced using the same platen pressing process as in Ex. 1 with Plate A in the embossing position. Pressing was for a short time and under moderate pressure as presented in Table IV. Although the depressed area fibers anchored well into the adhesive layer, the composite was capable of delamination by hand peel test without excessively tearing up the surface of the backing. Sample 4B repeated the procedure of sample 4A except that the underside of the fibrous outer layer was manually sanded with about 10 reciprocating strokes using 60 grit sandpaper such that the surface was roughened. After pressing the composite had the same good bulk and appearance characteristics as sample Ex. 4A and the backing layer could not be delaminated from the outer and adhesive layers without seriously damaging the outer layer or the backing layer.

To make sample 4C, Ex. 4A was repeated but deeper penetrating plate B was utilized. Thus the depressed areas anchored the outer layer more deeply into the composite than Ex. 4A. Without roughening the underside of the outer layer starting material, the composite had good cohesive strength to withstand delamination. That is, it could not be delaminated without damaging the outer or backing layers.

Ex. 4D was performed using the shallower protrusions of plate A and without sanding the underside of the outer layer before pressing. However, the press pressure was increased and the support plate was heated. This product did not delaminate without damaging the outer or backing layers.

In Example 4E the adhesive layer was eliminated. To compensate for lack of an independent adhesive layer, the deeper penetrating embossing plate (plate B), high pressure and longer pressing time were used. These conditions were sufficient to cause the polypropylene fibers within the backing layer to bond the fibers of the fibrous outer layer within the depressed areas. This product did not delaminate.

TABLE IV

| Ex. | Plate | Emboss Pressure MPa | Backup Tool Temp °C. | Time sec. | Composite Thickness mm | Embossment Thickness $T_f$ mm | Distance D mm | Ratio $D/T_f$ | Comment |
|---|---|---|---|---|---|---|---|---|---|
| 4A | A | 20.7 | 25 | 0.5 | 10.2 | 0.5 | 0.76 | 1.52 | Delaminated |
| 4B | A | 20.7 | 25 | 0.5 | 10.2 | 0.5 | 0.76 | 1.52 | Not Delaminated |
| 4C | B | 20.7 | 25 | 0.5 | 10.2 | 0.5 | 1.29 | 2.58 | Not Delaminated |
| 4D | A | 138 | 220 | 0.5 | 7.6 | 0.4 | 0.89 | 2.22 | Not Delaminated |
| 4E | B | 138 | 220 | 1.5 | 5.1 | 0.4 | 1.40 | 3.50 | Not Delaminated |

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A textured composite material comprising
   (a) an outer layer of fabric selected from the group consisting of knit, woven, stitch-bonded fabrics, felts, spunlaced fabrics, nonwoven webs of bonded fibers, nonwoven webs of entangled fibers and mixtures thereof, (b) an adjacent adhesive layer coextensive with the outer layer in which the composite material has a surface area comprising (i) depressed areas within which all the fibers are fully contacted by activated adhesive and have maintained structural identity of outer layer fibers, and (ii) elevated areas within which a major fraction of the lengths of the fibers of the outer layer are substantially free of inter-fiber bonding by the adhesive, and (c) a backing layer adjacent the adhesive layer opposite the outer layer, the backing layer having a thickness of about 2-20 mm.

2. The textured composite material of claim 1 in which the outer layer has a maximum thickness at each elevated area and the height of the elevated area above adjacent depressed areas is greater than the maximum thickness of such elevated area.

3. The textured composite material of claim 1 in which the outer layer together with the adhesive layer has a cross section profile defining a first contour at the surface of the outer layer and a second contour at the surface of the adhesive layer opposite the outer layer such that the first contour is undulated in phase with the second contour whereby peaks of the first contour align with corresponding peaks of the second contour and valleys of the first contour align with corresponding valleys of the second contour.

4. The textured composite material of claim 1 which defines a plane and in which portions of the fibers in the transition zones between the depressed areas and elevated areas at peripheral edges of the depressed areas are bound by activated adhesive in an orientation substantially normal to the plane.

5. The textured composite material of claim 1 in which individual fibers or linked fibers of the outer layer extend between at least two depressed areas.

6. The textured composite material of claim 1 in which the backing layer provides the material with absence of cupping or doming greater than 4 mm vertical deflection between center and edge of an 8 inch by 8 inch square sample of material which has been heated for 1 minute at 80° C., cooled for 30 minutes, and immersed in water and then dried for 48 hours.

7. The textured composite material of claim 1 which is a floorcovering carpet.

8. The textured composite material of claim 1 in which every point within the elevated areas is less than 20 mm from a depressed area.

9. The textured composite material of claim 1 in which the backing layer has a thickness of at least 0.95 cm.

10. The textured composite material of claim 1 in which the backing layer has a basis weight of about 0.14-2.7 $kg/m^2$ (4-80 $oz./yd^2$).

11. The textured composite material of claim 10 in which a portion of the backing layer within the depressed areas is exposed.

12. The textured composite material of claim 11 in which the fabric of the outer layer has a color scheme and the backing layer has a color such that exposed backing layer in combination with the color scheme of the outer layer impart to the textured composite material a preselected color-coordinated appearance.

13. The textured composite material of claim 10 in which the basis weight is at least 0.68 $kg/m^2$ (20 $oz./yd^2$).

14. A textured composite material comprising an outer layer of fabric comprising fibers and an adjacent adhesive layer coextensive with the outer layer in which the composite material has a surface area comprising (i) depressed areas within which all the fibers are fully contacted by activated adhesive and have maintained structural identity of outer layer fibers, and (ii) elevated areas within which a major fraction of the lengths of the fibers of the outer layer are substantially free of inter-fiber bonding by the adhesive, in which the textured composite material further comprises a backing layer adjacent the adhesive layer opposite the outer layer, the backing layer having a basis weight of about 0.14-2.7 $kg/m^2$ (4-80 $oz./yd^2$) and a thickness of about 2-20 mm, in which a portion of the backing layer within the depressed areas is exposed, in which the fabric of the outer layer has a color scheme and the backing layer has a color such that exposed backing layer in combination with the color scheme of the outer layer impart to the textured composite material a preselected color-coordinated appearance, and in which the backing layer has a plurality of strata each stratum being of a different color, and in which preselected strata are exposed within preselected areas of exposed backing layer such that the exposed backing layer exhibits a color scheme comprising more than one color.

15. A textured composite material comprising an outer layer of fabric selected from the group consisting of knit, woven, stitch-bonded fabrics, felts, spunlaced fabrics, nonwoven webs of bonded fibers, nonwoven webs of entangled fibers and mixtures thereof and an adjacent adhesive layer coextensive with the outer layer in which the composite material has a surface area comprising (i) depressed areas within which all the fibers are fully contacted by the activated adhesive and have maintained structural identity of outer layer fibers, and (ii) elevated areas within which a major fraction of the lengths of the fibers of the outer layer are substantially free of inter-fiber bonding by the adhesive, in which the outer layer has a maximum thickness at each elevated, area and the height of the elevated area above adjacent depressed areas is greater than the maximum thickness of such elevated area, which textured composite material further comprises a backing layer adjacent the adhesive layer opposite the fibrous outer layer, the backing layer having a basis weight of about 0.14-2.7 kg/m2 (4-80 oz./yd2) and a thickness of about 2-20 mm, and which textured composite material further comprises a breathable barrier layer of a vapor transmissive, liquid permeation resistant film between the adhesive layer and the backing layer.

16. A textured composite material formed by a method comprising the steps of (a) providing a fabric selected from the group consisting of knit, woven, stitch-bonded fabrics, felts, spunlaced fabrics, nonwoven webs of bonded fibers, nonwoven webs of entangled fibers and mixtures thereof defining an outer layer of the textured composite material, (b) depositing an adhesive layer of activatable adhesive uniformly on a side of the fabric, (c) compressing the fabric and adhesive layer between an embossing tool having a plurality of protrusions directed toward the fabric and an opposing backup tool, thereby forming (i) depressed areas where the protrusions contact the fabric and adhesive layer, (ii) elevated areas where the fabric is free of contact with the protrusions, and (iii) opposite cross section profile contours of the outer layer and the adhesive layer of the composite which are undulated in phase such that peaks of the outer layer profile contour align with corresponding peaks of the adhesive layer profile contour and valleys of the outer layer profile contour align with corresponding valleys of the adhesive layer profile contour, (d) activating the adhesive in contact with the protrusions without melting the fibers of the fabric such that all of the fibers within the depressed areas become fully contacted by activated adhesive and such that the fibers in the elevated areas are substantially free of inter-fiber bonding by the adhesive, and (e) relieving compression of the fabric and adhesive layer.

17. The textured composite material of claim 16 which defines a plane and in which the backup tool comprises a plurality of protrusions intermeshing with the protrusions of the embossing tool such that portions of the fibers at peripheral edges of the depressed areas are bound by activated adhesive in an orientation substantially normal to the plane.

18. The textured composite material of claim 16 which defines a plane and in which the backup tool comprises an elastically deformable surface facing the embossing tool such that portions of the fibers at peripheral edges of the depressed areas are bound by activated adhesive in an orientation substantially normal to the plane.

19. The textured composite material of claim 16 which defines a plane and in which the method further comprises prior to the compressing step, the step of providing a backing layer adjacent the adhesive layer opposite the outer layer and in which the compressing step comprises penetrating the embossing tool into the backing layer such that portions of the fibers at peripheral edges of the depressed areas are bound by activated adhesive in an orientation substantially normal to the plane.

20. The textured composite material of claim 16 in which the method further comprises prior to the compressing step, the step of providing a backing layer adjacent the adhesive layer opposite the outer layer, the backing layer having a basis weight of about 0.68-2.7 kg/m$^2$ (20-80 oz./yd$^2$).

21. A textured composite material consisting essentially of (a) an outer layer of fabric selected from the group consisting of knit, woven, stitch-bonded fabrics, felts, spunlaced fabrics, nonwoven webs of bonded fibers, nonwoven webs of entangled fibers and mixtures thereof and (b) an adjacent adhesive layer coextensive with the outer layer in which the composite material has a surface area comprising (i) depressed areas within which all the fibers are fully contacted by activated adhesive and have maintained structural identity of outer layer fibers, and (ii) elevated areas within which a major fraction of the lengths of the fibers of the outer layer are substantially free of inter-fiber bonding by the adhesive in which the outer layer together with the adhesive layer has a cross section profile defining a first contour at the surface of the outer layer and a second contour at the surface of the adhesive layer opposite the outer layer such that the first contour is undulated in phase with the second contour whereby peaks of the first contour align with corresponding peaks of the second contour and valleys of the first contour align with corresponding valleys of the second contour.

22. The textile composite material of claim 21 in which defines a plane and portions of the fibers at peripheral edges of the depressed areas are bound by activated adhesive in an orientation substantially normal to the plane.

* * * * *